UNITED STATES PATENT OFFICE.

CARL STRAUB, OF SYRACUSE, NEW YORK.

COMPOSITION OF MATTER.

SPECIFICATION forming part of Letters Patent No. 448,463, dated March 17, 1891.

Application filed April 18, 1890. Serial No. 348,532. (No specimens.)

*To all whom it may concern:*

Be it known that I, CARL STRAUB, of Syracuse, in the county of Onondaga, in the State of New York, have invented new and useful Improvements in a Composition of Matter for Architectural Purposes, of which the following is a full, clear, and exact description.

The purpose of this invention is to cause lime-mortar to set or solidify quicker and harder and to render it more tenacious and durable, and for that purpose I use infusorial earth or the silicious shells thereof, termed "diatomaceæ," which material I mix either with slaked lime, preferably in a dry pulverulent condition, or with unslaked lime, in the proportions of one part of infusorial earth to three parts of lime.

Infusorial earth possesses superior qualities for attaining the object of my invention, inasmuch as the diminutive shales of diatomaceæ are composed of opal silica and a slight degree of ammonia, which latter is derived from the animal matter. The opal silica is in an amorphous state and softer and more easily dissolved than the ordinary quartz silica. This soft opal silica and its accompanying ammonia is readily mixed with lime, and is thereby easily dissolved to form an opal silicate. When mixed with unslaked lime, a sufficient quantity of water is to be added to the mixture to perfectly slake the lime. The quantity of water used in slaking the lime should be accurately gaged to reduce the lime or aforesaid mixture to a dry powder. This dry powder is to be thoroughly stirred to effectually commingle the ingredients, and then the compound can be put up in barrels or other suitable packages for storing or transporting the compound.

In preparing the compound for use about three parts of sand are to be added to it, and a sufficient quantity of water is to be mixed with it to form a mortar of the requisite plastic condition to allow it to be used either for plastering walls of buildings or for joining stones or bricks in building walls.

The mortar formed as described possesses the advantages hereinbefore mentioned, and, if desired, other materials which are sometimes mixed with other mortars may also be added to the said compound. This, however, I deem unnecessary.

Although I prefer to prepare the compound of infusorial earth and lime in the manner hereinbefore described, yet it is obvious that the object of my invention may be obtained to some degree by mixing the infusorial earth with the lime during the process of mixing the mortar. Hence I do not limit myself to any specific stages of the process in which to mix the infusorial earth with the lime.

What I claim is—

The composition of matter consisting of slaked lime and infusorial earth, mixed in about the proportions specified.

In testimony whereof I have hereunto signed my name this 14th day of April, 1890.

CARL STRAUB. [L. S.]

Witnesses:
 MARK W. DEWEY,
 J. J. LAASS.